March 3, 1931.  F. KELP  1,794,463

ANIMAL TRAP

Filed Nov. 5, 1929

Inventor
Fred Kelp
By Glenn L. Fish
Attorney

Patented Mar. 3, 1931

1,794,463

UNITED STATES PATENT OFFICE

FRED KELP, OF DEER PARK, WASHINGTON, ASSIGNOR OF ONE-HALF TO ANDREW J. DUNCAN, OF SPOKANE, WASHINGTON

ANIMAL TRAP

Application filed November 5, 1929. Serial No. 404,954.

My invention relates to animal traps and more particularly to a device for trapping fur bearing animals. Certain objects of the invention are to provide an animal trap comprising means whereby the animal is pinioned securely and killed quickly so that he may not chew or otherwise damage his fur. Further objects are to provide a novel trigger arrangement that is positive and unfailing in its operation. Other objects are to provide animal traps that may be taken apart and nested for packing and which comprise other novel details of construction as hereinafter set forth.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a view in longitudinal vertical section of the trap;

Fig. 2 is a top plan view of the same with an upper portion of the housing broken away;

Fig. 3 is a view in front end elevation;

Fig. 4 is a detail view in perspective of the sharp curved lip and showing the U-spring in engagement therewith; and Fig. 5 is a view in transverse vertical section of the trap with its bottom removed and showing in dotted lines the manner in which a number of the traps may be nested in packing for shipment.

Referring to the drawings throughout which like reference numerals designate like parts, the numeral 5 indicates the trap housing as a whole which consists of a top, a closed integral rear wall 6, an open front 7 and integral sides 8 that slant outwardly from the top. The numeral 9 designates the bottom which is provided with side flanges 10 and is held in place by a pair of transverse bolts 11 passing through said flanges and the lower side edge portions as will be understood.

A bait hook 12 is secured to the rear wall 6 and a U-spring 13 has its ends secured to the top wall of the housing 5. Said spring is provided with coils 14 disposed adjacent the upper rear corners of the housing and the arms of the spring extend closely along the sides 8 of the housing to a point adjacent the front end 7 where they are connected by a transverse downwardly curved portion 15.

A trigger abutment 16 is pivoted at 17 to the bottom 9 and is provided with a curved depression or saddle 18 at its top which provides space for the animal to enter before springing the trap. A keeper tongue 19 is pivoted at 20 to the bottom and its free end is provided with a shoulder 21 which engages against the trigger abutment when said end is placed in a slot 22 therein and thus retains the trigger abutment in a vertical position when the trap is set. It will be understood that said keeper engages the upper side of the downwardly curved spring portion 15 thus holding said spring in compression whereby the trap is in readiness to catch an animal.

Upon entering the trap and in trying to reach the bait on the hook 12 the animal presses backwardly upon the trigger abutment 16 and frees same from the keeper tongue 19 which in turn releases the spring 13 which springs upward to the dotted position shown in Fig. 1. A sharp curved lip 23 is secured to the top of the housing 5 and is provided with a pair of curved end shoulders 24 in which the side arms of the spring come to rest when the trap is sprung as clearly shown in Fig. 4 of the drawings. The animal's neck is caught between the curved portion of said lip and the oppositely curved portion 15 of the spring with a grasp which prevents the animal from chewing or otherwise damaging his fur and which quickly causes his death by choking.

The bolts 11 may be readily detached and the bottom 9 removed. The slanting sides 8 of the housing permit the devices to be nested one within the other for shipment as shown in Fig. 5.

Having thus described my invention, it being understood that minor changes may be resorted to in its construction without departing from its scope and spirit, what I claim and desire to secure by Letters Patent of the United States is:—

An animal trap comprising a housing, slanting sides for the housing, a detachable bottom, a U-spring mounted in the housing, a downwardly curved front connecting portion for the spring, a transversely pivoted trigger abutment having a curved depression in its top, a pivoted trigger tongue, a shoulder for the end of said tongue adapted to retain said trigger abutment in a vertical position when the trap is set, and a sharp curved lip for the top wall of the housing adapted to be engaged by the U-spring when the trap is sprung.

In testimony whereof I affix my signature.

FRED KELP.